United States Patent
Enciso et al.

(10) Patent No.: US 12,476,812 B2
(45) Date of Patent: Nov. 18, 2025

(54) VIRTUAL ENVIRONMENT-TO-REAL WORLD SECURED COMMUNICATION CHANNEL

(71) Applicant: Bank of America Corporation, Charlotte, NC (US)

(72) Inventors: Catalina Enciso, Mooresville, NC (US); Kathleen Hanko Trombley, Oakboro, NC (US); Heather Dolan, Sarasota, FL (US)

(73) Assignee: Bank of America Corporation, Charlotte, NC (US)

( * ) Notice: Subject to any disclaimer, the term of this patent is extended or adjusted under 35 U.S.C. 154(b) by 266 days.

(21) Appl. No.: 18/159,730

(22) Filed: Jan. 26, 2023

(65) Prior Publication Data

US 2024/0259201 A1   Aug. 1, 2024

(51) Int. Cl.
*H04L 29/00* (2006.01)
*H04L 9/30* (2006.01)
*H04L 9/32* (2006.01)

(52) U.S. Cl.
CPC .............. *H04L 9/3213* (2013.01); *H04L 9/30* (2013.01)

(58) Field of Classification Search
CPC ................................ H04L 9/3213; H04L 9/30
USPC .......................................................... 713/159
See application file for complete search history.

(56) References Cited

U.S. PATENT DOCUMENTS

| | | | |
|---|---|---|---|
| 7,162,442 B2 | 1/2007 | Lapstun et al. | |
| 7,945,580 B2 | 5/2011 | Silverbrook et al. | |
| 8,560,366 B2 | 10/2013 | Mikurak | |
| 9,472,043 B2 | 10/2016 | Mockus et al. | |
| 9,870,561 B2 | 1/2018 | Kramer | |
| 10,013,705 B2 | 7/2018 | Mikurak | |
| 10,176,642 B2 | 1/2019 | Tran et al. | |
| 10,492,981 B1 | 12/2019 | Kumar | |
| 10,685,379 B2 | 6/2020 | Purves et al. | |
| 11,351,447 B1* | 6/2022 | Kumar | A63F 13/25 |
| 2007/0060114 A1 | 3/2007 | Ramer et al. | |
| 2007/0186238 A1 | 8/2007 | Schrager et al. | |
| 2008/0091610 A1 | 4/2008 | Benjamin | |
| 2012/0089410 A1 | 4/2012 | Mikurak | |
| 2013/0198861 A1* | 8/2013 | Kishi | G06F 21/445 726/28 |
| 2013/0218721 A1 | 8/2013 | Borhan et al. | |
| 2016/0210602 A1 | 7/2016 | Siddique et al. | |

(Continued)

*Primary Examiner* — Brandon Hoffman
*Assistant Examiner* — Michael D Anderson (57) ABSTRACT

A system comprises a virtual environment device and an entity device. The virtual environment device receives interaction initiate message from an avatar being operated in a virtual environment. The interaction initiate message includes a request to provide a particular resource to a user in the real world, identity token indicating the identities of the user and the entity, and interaction token indicating information on providing the particular resource to the user. The virtual environment device communicates an interaction request message to the entity device, where the interaction request message includes portion(s) of the interaction initiate message and an authentication token that is generated based on user physical attributes and avatar virtual attributes. The system verifies that the user initiated the interaction initiate message based on evaluating the authentication token. In response, the system provides the requested resource to the user.

20 Claims, 4 Drawing Sheets

(56) References Cited

U.S. PATENT DOCUMENTS

| | | |
|---|---|---|
| 2017/0161807 A1 | 6/2017 | Aielli |
| 2020/0029128 A1 | 1/2020 | Erskine |
| 2020/0302693 A1 | 9/2020 | Singh et al. |
| 2021/0365940 A1 | 11/2021 | Tietzen et al. |
| 2022/0036295 A1 | 2/2022 | Lert, Jr. |
| 2023/0009304 A1* | 1/2023 | Jakobsson .......... G06Q 30/0241 |

* cited by examiner

VIRTUAL ENVIRONMENT-TO-REAL WORLD SECURED COMMUNICATION CHANNEL

TECHNICAL FIELD

The present disclosure relates generally to network security, and more specifically to a virtual environment-to-real world secured communication channel.

BACKGROUND

As the Internet continues to be utilized by an ever-increasing number of users, fraudulent and criminal activity via the Internet also rises. Users of virtual environments are not safe from such criminal activities. In data transmission from the virtual environments to the real world through the Internet, the data is exposed to bad actors and cyberattacks. It is challenging to transmit data from virtual environments to the real world without exposing the data to bad actors and cyberattacks.

SUMMARY

The system described in the present disclosure is particularly integrated into practical applications of improving network security for data communications between virtual environments and the real world; and providing user verification and authentication in conjunction with network transmissions. In particular, the disclosed system improves the network security of data communication between computer systems that maintain and manage virtual environments, computer systems that users use to access virtual environments, and computer systems associated with entities that have virtual representations within the virtual environments. These practical applications lead to the technical advantage of improving network security, the security of non-public information that can be accessed from user profiles. Therefore, the disclosed system minimizes (or prevents) unauthorized access to non-public information. This leads to securing non-public information from unauthorized access by bad actors.

The present disclosure contemplates a system and a method to establish a secured communication channel that bridges a virtual environment to the real world and to grant a user request that is initiated in the virtual environment in the real world upon the validation of the user. In an example scenario, assume that a user operating an avatar in the virtual environment wants to receive a particular resource from an entity that has a virtual representation within the virtual environment. The entity may be an organization that provides services and/or physical items to users or subscribers. For example, assume that the user operates the avatar to enter a virtual location associated with the entity. The virtual location may be a virtual representation of the entity. For example, the virtual location may be a virtual store, a virtual office, a virtual library, and the like. The avatar can access and observe the services and/or products that the entity provides by visiting the virtual location. The avatar can interact with virtual items at the virtual location (e.g., pickup, examine, put down, etc.). If the user wants to receive a particular resource (e.g., a physical counterpart of the virtual item), the user may operate the avatar to initiate an interaction with the entity and to request to receive the particular resource in the real world. In some cases, a bad actor may gain unauthorized access to the avatar of the user to impersonate the user and transfer resources (e.g., virtual items and/or physical items) to themselves or another unauthorized party in the real world and/or in the virtual environment. If such unauthorized accesses are left undetected, bad actors may transfer items to themselves or others without the users or computer systems maintaining the virtual environment or computer system associated with entities knowing about it. The current virtual environment management technology lacks providing a secured communication channel to bridge the virtual environment to the real world and, hence, lacks protecting the user's profiles and information (collectively referred to herein as resources).

The disclosed system provides practical applications of improving network security for data communications between virtual environments and the real world, for example, by encrypting at least a portion of the interaction initiate message transmitted from the avatar by a public encryption key and requesting the user to decrypt the encrypted portion(s) of the interaction initiate message. The legitimate user associated with the avatar may be provided with a private encryption key that is configured to decrypt the encrypted portion(s) of the interaction initiate message. Therefore, only the legitimate user may be able to decrypt the encrypted portion(s) of the interaction initiate message and communicate back the decrypted portion(s) of the interaction initiate message to the disclosed system.

This, in turn, leads to an additional practical application of providing user verification and authentication in conjunction with network transmissions and user authentication prior to allowing the avatar to complete or even initiate an interaction with an entity within the virtual environment, e.g., by implementing the public and private encryption keys to facilitate the user authentication and verification process.

The disclosed system may implement multi-factor authentication techniques to facilitate the user authentication and verification and increase the network security of the channel between the virtual environment and the real world and to facilitate user authentication and verification. In certain embodiments, the disclosed system may implement public and private encryption keys, similar to that described above, as one of the multi-factor authentication techniques. In certain embodiments, the disclosed system may verify the identity of the user based on the biometric features of the user. For example, the disclosed system may request the user to provide an image, a fingerprint, etc., extract biometric features from the user input (e.g., facial features, fingerprint features, etc.) and compare the extracted biometric features with the previously-stored biometric features of the user. In certain embodiments, the disclosed system may verify the identity of the user based on user physical attributes and avatar virtual attributes, such as a gesture performed by the user and avatar. For example, the disclosed system may determine that the user is associated with and linked to the avatar if they both perform a predefined gesture in response to a request in the user authentication and verification process.

In certain embodiments, a system for concluding a request in the real world based on initiation from a virtual environment comprises a virtual environment device operably coupled with an entity device. The virtual environment device comprises a first memory operably coupled with a first processor. The first memory is configured to store avatar information that indicates attributes of an avatar within a virtual environment, wherein the avatar is associated with a user. The first processor is configured to receive an interaction initiate message from the avatar. The interaction initiate message comprises a request to receive a particular resource from an entity in the real world. The interaction initiate message further comprises at least one of an identity token and an interaction token. The identity token indicates a first identity of the user and a second identity of the entity. The interaction token comprises information about providing the particular resource to the user. The first processor is further configured to determine the second identity of the entity based at least in part upon the identity token. In response to determining the second identity of the entity, the first processor is further configured to communicate an interaction request message to an entity server associated with the entity. The interaction request message comprises at least a portion of the interaction initiate message and an authentication token that is used to verify the user. The entity device comprises a second memory operably coupled with a second processor. The second memory is configured to store information about resources that the entity provides to users. The second processor is configured to receive the interaction request message. The second processor is further configured to determine the first identity of the user based at least in part upon the identity token. The second processor is further configured to verify that the user initiated the interaction initiate message from within the virtual environment via the avatar. In response to verifying that the user initiated the interaction initiate message from within the virtual environment via the avatar, the second processor is further configured to provide the particular resource to the user in the real world.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
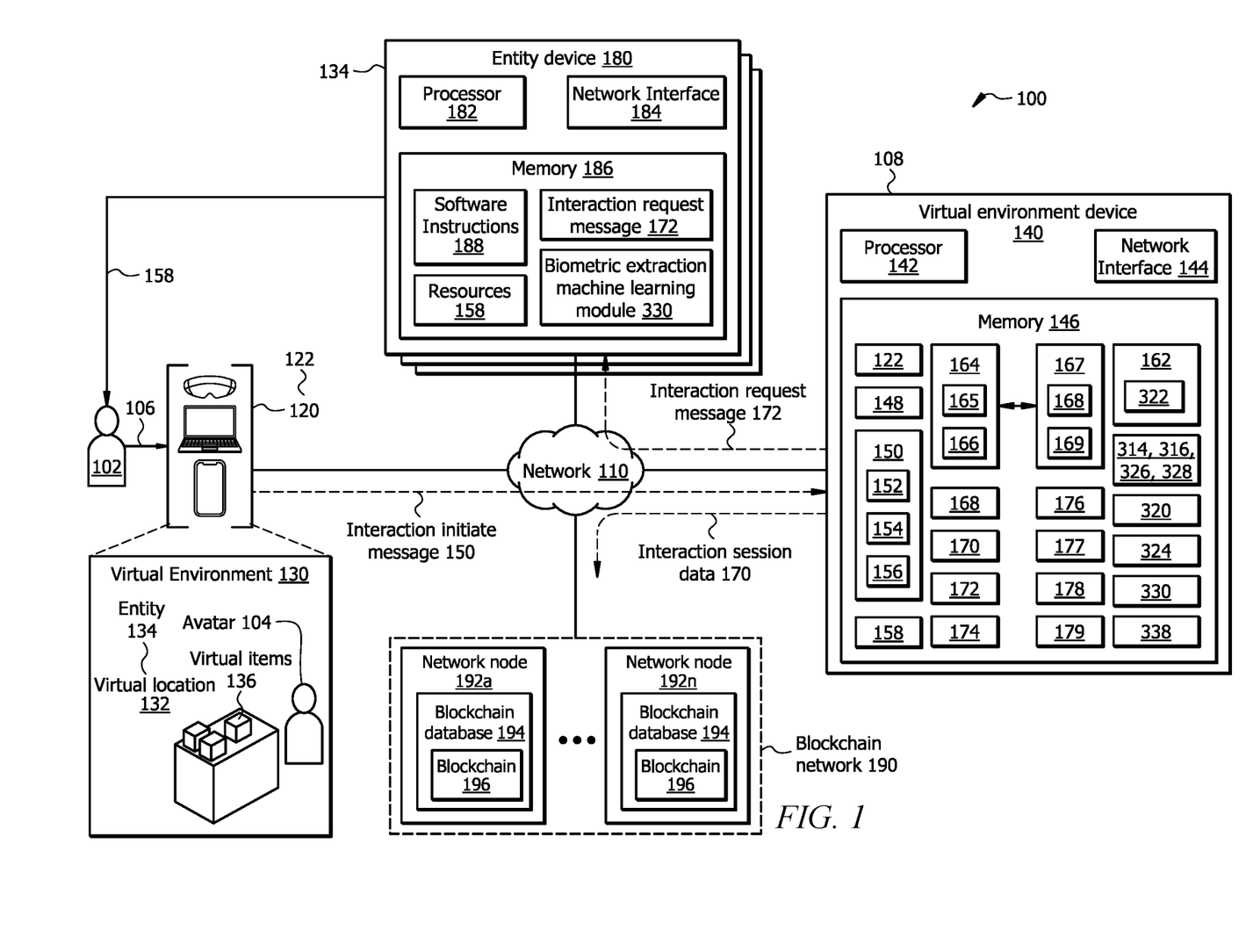
FIG. 1 illustrates an embodiment of a system configured to establish a secured communication channel that bridges a virtual environment to the real world.

As described above, previous technologies fail to provide efficient and reliable solutions to establish a secured communication channel that bridges a virtual environment to the real world. Embodiments of the present disclosure and its advantages may be understood by referring to FIGS. 1 through 4. FIGS. 1 through 4 are used to describe systems and methods to establish a secured communication channel that bridges a virtual environment to the real world.
System Overview FIG. 1 illustrates an embodiment of a system 100 that is generally configured to establish a secured communication channel that bridges a virtual environment to the real world and to grant a user request that is initiated in the virtual environment in the real world. In particular, the system 100 is configured to implement a secured communication channel between a virtual representation of an entity 134 within the virtual environment 130 and a user 102 in the real world to verify the identity of the user 102 and grant the user request initiated from within the virtual environment 130 in response to the identity of the user 102 being verified. In certain embodiments, the system 100 comprises a virtual environment device 140 operably coupled with a computing device 120, one or more entity devices 180, and a blockchain network 190 via a network 110. Network 110 enables the communication among the components of the system 100. The virtual environment device 140 comprises a processor 142 in signal communication with a memory 146. Memory 146 stores software instructions 148 that when executed by the processor 142 cause the virtual environment device 140 to perform one or more operations described herein. The entity device 180 comprises a processor 182 in signal communication with a memory 186. Memory 186 stores software instructions 188 that when executed by the processor 182 cause the entity device 180 to perform one or more operations described herein. In other embodiments, system 100 may not have all of the components listed and/or may have other elements instead of, or in addition to, those listed above.

In general, the system 100 improves the network security for data communication between computer systems that maintain and manage virtual environments (e.g., virtual environment devices 140), computer systems that users use to access virtual environments 130 (e.g., computing devices 120), and computer systems associated with entities 134 that have virtual representations within the virtual environments 130 (e.g., entity devices 180). In an example scenario, assume that a user 102 operating an avatar 104 in the virtual environment 130 wants to receive a particular resource 158 from an entity 134 that has a virtual representation within the virtual environment 130. The entity 134 may be an organization that provides services and/or physical items to users or subscribers. For example, assume that the user 102 operates the avatar 104 to enter a virtual location 132 associated with the entity 134. The virtual location 132 may be a virtual representation of the entity 134. For example, the virtual location 132 may be a virtual store, a virtual office, a virtual library, and the like. The avatar 104 can access and observe the services and/or products that the entity 134 provides by visiting the virtual location 132. The avatar 104 can interact with virtual items at the virtual location 132 (e.g., pickup, examine, put down, etc.). If the user 102 wants to receive a particular resource 158 (e.g., a physical counterpart of the virtual item 136), the user 102 may operate the avatar 104 to initiate an interaction with the entity 134 and to request to receive the particular resource 158 in the real world. In some cases, a bad actor may gain unauthorized access to the avatar 104 of the user 102 to impersonate the user 102 and transfer resources 158 (e.g., virtual resources and/or physical resources) to themselves or another unauthorized party in the real world or virtual environment. If such unauthorized accesses are left undetected, bad actors may transfer resources 158 to themselves or others without the users 102 or computer systems maintaining the virtual environment or computer system associated with entities 134 knowing about it. The current virtual environment management technology lacks providing a secured communication channel to bridge the virtual environment to the real world and, hence, lacks protecting the user's profiles and information (collectively referred to herein as resources).

In certain embodiments, the system 100 verifies the identity of the user 102 operating the avatar 104 and the identity of the entity 134 before allowing any data transfer operation between the avatar 104 and the entity 134. Accordingly, the system 100 is integrated into a practical application of improving network security in data transfer operations between the virtual environment 130 and the real world. By improving the network security in data transfer operations among entities and avatars, user's resources, including virtual/digital resources and physical resources are kept secure from unauthorized access. For example, the system 100 is configured to prevent or minimize a bad actor impersonating a user and operating a user's avatar in a virtual environment to transfer resources to themselves or another party. In another example, if a bad actor impersonates a user and operates a user's avatar in a virtual environment to transfer resources to themselves or another party, the system 100 is configured to detect that the bad actor is impersonating the user and prevent the data transfer to occur, for example, by denying the bad actor's request to transfer data objects indicating resources. For verifying the identity of the user 102 initiating a data transfer in a virtual environment, the system 100 is configured to combine information received from the user 102 (in the real-world) and information received from an avatar 104 of the user 102 (in the virtual environment 130). Thus, a bad actor would have to alter or spoof both information received from the real world and the virtual environment 130 in order to impersonate the user's avatar 104 to transfer data objects. This increases the spoofing complexity for the bad actor, which makes conducting an unauthorized data transfer difficult. This leads to minimizing (or preventing) unauthorized data transfers within virtual environments 130, from virtual environment 130 to the real world, and from the real world to virtual environment 130.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

Figure 2:
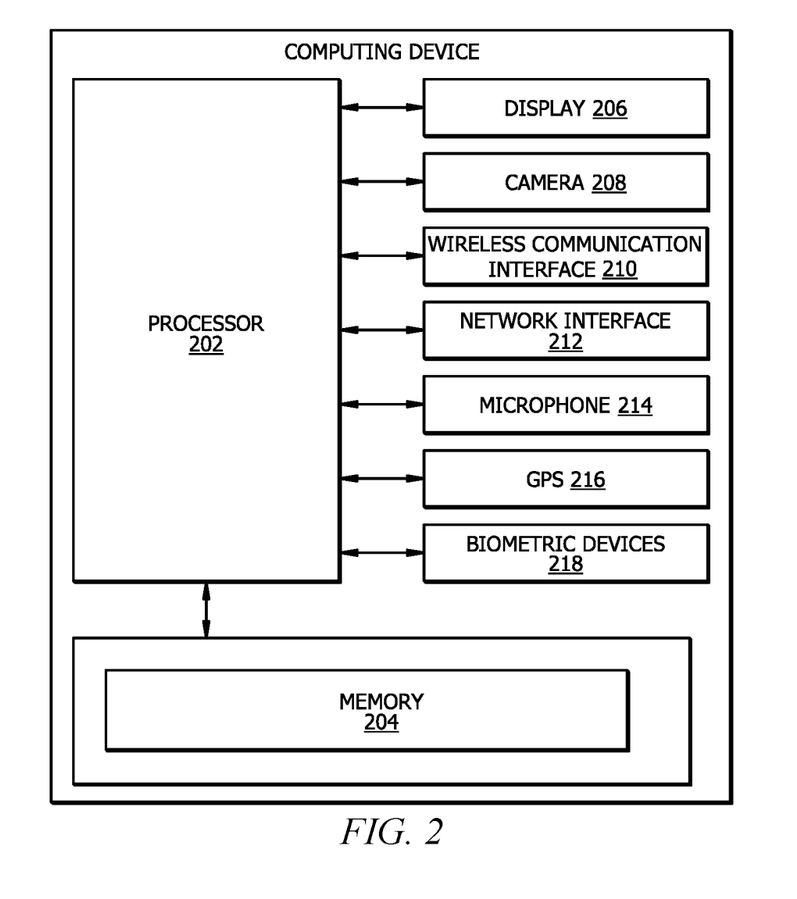
FIG. 2 illustrates a block diagram of an embodiment of a computing device used by the system of FIG. 1.

Computing device 120 is described in detail in the discussion of FIG. 2. In brief, a computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, keypad, or other appropriate terminal equipment usable by user 102. The computing device 120 may include a hardware processor, memory, and/or circuitry (see FIG. 2) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110. In the present disclosure, the computing device 120 may be interchangeably referred to as a user device.

FIG. 2 illustrates a block diagram of an embodiment of the computing device 120 used by the system 100 of FIG. 1. The computing device 120 may be configured to display the virtual environment 130 (see FIG. 1) within a field of view of the user (see FIG. 1), capture biometric, sensory, and/or physical information of the user wearing and/or operating the computing device 120, and to facilitate an electronic interaction between the user and other components of the system 100 (see FIG. 1), including the virtual environment device 140.

In the illustrated embodiment, the computing device 120 comprises a processor 202, a memory 204, a display 206, a camera 208, a wireless communication interface 210, a network interface 212, a microphone 214, a global positioning system (GPS) sensor 216, and biometric devices 218. The components of the computing device 120 are operably coupled to each other via wires and/or wireless communications. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions, including software instructions that when executed by the processor 202 cause the computing device 120 to perform one or more operations of the computing device 120 described herein. For example, the one or more processors are configured to execute instructions to implement the function disclosed herein, such as some or all of those described with respect to FIGS. 1-4. For example, processor 202 may be configured to display the virtual environment (130 in FIG. 1), virtual objects and locations within the virtual environment (130 in FIG. 1) on display 206, detect avatar location in the virtual environment, detect user location in the real world, identify virtual sub-environment/ locations within the virtual environment, capture biometric information of a user, via one or more of camera 208, microphone 214, and/or biometric devices 218, and communicate via wireless communication interface 210 with virtual environment device 140 (see FIG. 1) and/or other user devices 120 and/or entity device 180 (see FIG. 1).

Memory 204 is operable to store any of the information described with respect to FIGS. 1-4 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution. In some embodiments, the memory 204 may store and/or include a browser or web application for a computing device 120 to interact with the entity (134 in FIG. 1) and the virtual location (132 in FIG. 1), such as, for example, to access application services (e.g., application 122 (see FIG. 1)) in the virtual environment 130.

Display 206 may be or include a display screen that allows displaying objects (e.g., virtual and/or physical objects). Display 206 is configured to present visual information to a user (for example, user 102 in FIG. 1) in an augmented reality environment that overlays virtual or graphical objects onto tangible objects in a real scene in real-time. In certain embodiments, the display 206 is configured to present visual information to the user as the virtual environment 130 (see FIG. 1) in real-time. In certain embodiments, display 206 is a wearable optical display (e.g., glasses or a headset) configured to reflect projected images and enables a user to see through the display 206. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In certain embodiments, display 206 is a graphical display on a computing device 120. For example, the graphical display may be the display of a tablet or smart phone configured to display an augmented reality environment with virtual or graphical objects overlaid onto tangible objects in a real scene in real-time environment and/or virtual environment 130.

Camera 208 may be or include any camera that is configured to capture images of a field of view in front of the computing device 120 and/or in front of the camera 208. Examples of the camera 208 may include charge-coupled device (CCD) cameras and complementary metal-oxide semiconductor (CMOS) cameras. For example, camera 208 may be configured to capture images of a wearer of the computing device 120. Camera 208 may be configured to capture images continuously, at predetermined intervals, or on-demand. For example, camera 208 may be configured to receive a command from the user to capture an image. In another example, camera 208 is configured to continuously capture images to form a video stream. Camera 208 is communicably coupled to processor 202.

Wireless communication interface 210 may be or include any communication interface that allows communication with other devices. The wireless communication interface 210 is configured to facilitate processor 202 in communicating with other devices. Wireless communication interface 210 is configured to employ any suitable communication protocol, including WIFI, Bluetooth, among others.

Network interface 212 is configured to enable wired and/or wireless communications. The network interface 212 may be configured to communicate data between the computing device 120 and other devices, systems, or domains of the system 100 (see FIG. 1). For example, the network interface 212 may comprise a near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 202 may be configured to send and receive data using the network interface 212. The network interface 212 may be configured to use any suitable type of communication protocol.

Microphone 214 may be or include a sound-detecting sensor or sound-detecting sensor array. Microphone 214 is generally configured to capture audio signals (e.g., voice signals or commands) from a user. Microphone 214 is communicably coupled to processor 202. Microphone 214 may communicate the detected audio signals to the processor 202.

GPS sensor 216 may be configured to capture and provide geographical location information. For example, GPS sensor 216 is configured to provide a geographic location of a computing device 120. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202. GPS sensor 216 may communicate the captured location of the computing device 120 to the processor 202.

Examples of biometric devices 218 may include, but are not limited to, retina scanners and fingerprint scanners. Biometric device 218 is communicably coupled to processor 202. Biometric devices 218 are configured to capture information about a person's physical characteristics and to output a biometric signal based on captured information. The biometric device 218 may communicate the captured biometric features to the processor 202.

Referring back to FIG. 1, the computing device 120 is configured to display a two-dimensional (2D) or three-dimensional (3D) representation of a virtual environment 130 to a user. Examples of a virtual environment 130 include, but are not limited to, a graphical or virtual representation of a metaverse, a map, a city, a building interior, a landscape, a fictional location, an alternate reality, or any other suitable type of location or environment.

Virtual Environment Device

Virtual environment device 140 generally includes a hardware computer system configured to implement a secured communication channel that bridges the virtual environment 130 and the real world. More specifically, the virtual environment device 140 may be configured to implement the secured communication channel between the avatar 104 of a user 102 and an entity device 180 in the real world in order to verify the identity of the user 102 and the entity 134, and to conclude a request that is initiated from within the virtual environment 130 by the avatar 104 in the real world. In other words, the virtual environment device 140 may implement a secure data transfer among and between entities 134 and avatars 104 (and users 102). In certain embodiments, the virtual environment device 140 may be implemented by a cluster of computing devices, such as virtual machines. For example, the virtual environment device 140 may be implemented by a plurality of computing devices using distributed computing and/or cloud computing systems in a network. In certain embodiments, the virtual environment device 140 may be configured to provide services and resources (e.g., data and/or hardware resources) to the components of the system 100.

The virtual environment device 140 comprises a processor 142 operably coupled with a network interface 144 and a memory 146. Processor 142 comprises one or more processors operably coupled to the memory 146. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and stores the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the virtual environment device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-4. For example, the processor 142 may be configured to perform one or more operations of the operational flow 300 described in FIG. 3 and one or more operations of the method 400 as described in FIG. 4.

Network interface 144 is configured to enable wired and/or wireless communications. The network interface 144 may be configured to communicate data between the virtual environment device 140 and other devices, systems, or domains of the system 100. For example, the network interface 144 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-4 along with any other data, instructions, logic, rules, or code operable to implement the function(s) described herein when executed by processor 142. For example, the memory 146 may store software instructions 148, interaction initiate message 150, authentication token 176, avatar virtual attributes 324, virtual environment information 164, real-world information 167, interaction request message 172, encryption algorithm 177, private encryption key 178, public encryption key 179, resources 158, user profiles 162, biometric feature extraction machine learning module 330, interaction sessions 170, API service 174, application, user input 106, token generator 320, messages 314, 316, 326, 328, countermeasure actions 338, and/or any other data or instructions. The software instructions 148 may comprise any suitable set of instructions, logic, rules, or code operable to execute the processor 142 and perform the functions described herein, such as some or all of those described in FIGS. 1-4.

The user input 106 may include data that the user 102 provides to the computing device 120 for validating the identity of the user 102. For example, the user 102 may be asked to provide proof of identity by the virtual environment device 140 and/or the entity device 180. In response, the user 102 may input user data to the computing device 120 by operating user interfaces of the computing device 120, similar to that described in FIG. 2. The user input 106 may include a security code, an image, a biometric signal, a voice sample, a location, and the like.

The user profiles 162 may include profiles of users 102 who are members or clients of the organization 108 that provide access of the virtual environment 130 to users. The user profile 162 associated with a user 102 may include user information, authentication token, and physical attributes 322 of the user 102. The user information includes a name of the user 102, an address of the user 102, an identifier number associated with the user 102, and other information associated with the user 102. The authentication token may include a particular code or number. The authentication token may be used to authenticate the user information and ultimately the user 102. The physical attributes 322 of the user 102 may include the physical location of the user 102 (e.g., determined by the GPS sensor (216 in FIG. 2) of the computing device 120), an image of the user 102, biometric features of the user 102 (e.g., facial features, fingerprints, retinal features, voice features, pose features, etc.), a gesture performed by the user 102 (e.g., in an image), and the like, for example. The virtual attributes 324 of the avatar 104 may include a virtual location of the avatar 104 in the virtual environment 302, a visual shape of the avatar 104, a gesture performed by the avatar 104, and the like, for example.

The virtual world information 164 comprises user information 165 and environment information 166. The user information 165 generally comprises information that is associated with any accounts or profiles that can be used within a virtual environment 130. For example, user information 165 may comprise user profile information, online account information, avatar information, digital resources information, virtual asset information, or any other suitable type of information that is associated with a user 102 and their avatar 104 within a virtual environment 130. The environment information 166 generally comprises information about the appearance of a virtual environment 130. For example, the environment information 166 may comprise information associated with objects, landmarks, buildings, structures, avatars, entity (e.g., entity 134), or any other suitable type of element that is present within a virtual environment 130. In some embodiments, the environment information 166 may be used to create a representation of a virtual environment 130 for users 102. In this case, a virtual environment 130 may be implemented using any suitable type of software framework or engine.

The real-world information 167 comprises user information 168 and environment information 169. The user information 168 generally comprises information that is associated with any accounts or profiles that can be used within the real world. For example, user information 168 may comprise user profile information, user profile 162, account information, real-world resource information, real world asset information, or any other suitable type of information that is associated with a user 102 within a real-world environment. The environment information 169 generally comprises information that is associated with an entity (e.g., organization) within the real world that the user 102 is a member of or is associated with. For example, the environment information 169 may comprise addresses, phone numbers, email addresses, contact names, or any other suitable type of information that is associated with an entity. Since the virtual environment device 140 has access to both the virtual world information 164 and the real-world information 167, the virtual environment device 140 is able to link together the virtual world information 164 and the real-world information 167 for a user 102 such that changes to the virtual world information 164 affect or propagate to the real-world information 167 and vice-versa. For example, the virtual environment device 140 may be configured to store one or more maps (e.g., actions of an avatar 104, virtual interaction sessions 170, etc.) that translate or convert different types of interactions between the real world and the virtual environment 130 and vice-versa.

In certain embodiments, the virtual environment information 164 may be a "twin" of the real-world information 167. For example, any change or update to the virtual environment 130 may be captured by the virtual environment device 140, and a corresponding change may be propagated or affected onto the real-world information 167, and vice versa. In certain embodiments, for example, if the avatar 104 of the user 102 initiates a request to receive a particular virtual item 136 at the virtual location 132, adds the virtual item 136 to a virtual basket, and conducts/performs/concludes a virtual interaction, upon validation of the identity of the user 102, a physical counterpart of the virtual item 136 may be provided to the user 102 in the real world.

Interaction session data 170 may include information related to the interaction between the avatar 104, computing device 120, virtual environment device 140, and entity device 180. For example, the interaction session data 170 may include the interaction initiate message 150, interaction request message 172, requested resource 158, avatar virtual attributes 324, user profile 162, interaction data between the user 102 (and the avatar 104) and the entity 134, user inputs 106, the entity 134, the result of the verification process of the identity of the user 102 and entity 134, and/or any other information. The interaction session 170 may be stored in the blockchain network 190.

Encryption algorithm 177 may be implemented by the processor 142 executing the software instructions 148, and is generally configured to encrypt an input given to it. The encryption algorithm 177 may be associated with the private encryption key 178 and the public encryption key 179. The private encryption key 178 may be unique to each user 102 and only provided to the authorized user 102 that is required to be authenticated. The public encryption key 179 may be public to virtual environment device 140 and/or entity device 180 upon request.

Token generator 320 may be implemented by the processor 142 executing the software instructions 148, and is generally configured to generate authentication tokens 176 for each user 102 based on user physical attributes 322 and avatar virtual attributes 324 associated with a respective user 102. In certain embodiments, the authentication token 176 may include a vector that represents the user physical attributes 322 and avatar virtual attributes 324. For example, the authentication token 176 may include the user physical attributes 322 and avatar virtual attributes 324 as represented by vectors generated by neural networks. In certain embodiments, the authentication token 176 may include the user physical attributes 322 and avatar virtual attributes 324. In certain embodiments, the authentication token 176 may include a random number or a random alphanumeric string. In certain embodiments, the token generator 320 may include a random number generator algorithm and/or an alphanumeric string generator algorithm that is configured to generate a random number and/or a random alphanumeric string as an authentication token 176. The authentication token 176 may not be altered or otherwise changed. In certain embodiments, each authentication token 176 may be associated with and/or mapped with a respective user 102 and avatar 104. The authentication token 176 may be used to verify the identity of the user 102.

Biometric feature extraction machine learning module 330 may be implemented by the processor 142 executing the software instructions 148, and is generally configured to extract biometric features from the user input 106, user profile 162, among other inputs. In certain embodiments, the biometric feature extraction machine learning module 330 may include image processing, voice sample processing, fingerprint pattern processing, retinal sample processing algorithms. For example, in case the input is an image, the biometric feature extraction machine learning module 330 may extract facial features from the image. In another example, in case the input is a voice sample, the biometric feature extraction machine learning module 330 may extract voice features from the voice sample. In another example, in case the input is a fingerprint sample, the biometric feature extraction machine learning module 330 may extract fingerprint features from the fingerprint sample. In another example, in case the input is a retinal sample, the biometric feature extraction machine learning module 330 may extract retinal features from the retinal sample. The extracted features may represent characteristics of the input sample data. The extracted features may be used in verifying the identity of the user 102.

In certain embodiments, the biometric feature extraction machine learning module 330 may include a support vector machine, neural network, random forest, k-means clustering, Tree-based algorithm, Random Forest algorithm, etc. The biometric feature extraction machine learning module 330 may be implemented by supervised, semi-supervised, or unsupervised training algorithms. In a training stage, the biometric feature extraction machine learning module 330 may be given a training dataset comprising sample data (e.g., images, voice samples, fingerprint samples, retinal samples, etc.), each labeled with a respective user identity (e.g., a name of the user) associated with the sample data. The biometric feature extraction machine learning module 330 may extract features from the sample data and learn to associate between each sample data and respective user identity. In the testing stage, the biometric feature extraction machine learning module 330 is given unlabeled sample data and is asked to predict the identity of the user associated with the sample data. In the refining stage and in backpropagation, the biometric feature extraction machine learning module 330 may update the weight and bias values of the neural networks to increase the accuracy of the prediction of the biometric feature extraction machine learning module 330.

Entity Device

Entity device 180 is generally a hardware computing system that is configured to maintain and manage operations of the entity 134 in the real world and/or in the virtual environment 130. In certain embodiments, for example, the entity device 180 may implement an enterprise resource planning to implement functions related to managing and tracking resources 158 (e.g., physical items and counterpart virtual items 136), client relations, supply chains, and other operations of the entity 134. Examples of the entity device 180 may include, but are not limited to, a cluster of servers and distributed computing systems in a network. In certain embodiments, the entity device 180 may be configured to provide services and resources (e.g., data and/or hardware resources) to the components of the system 100. For example, the entity device 180 may be configured to validate the identity of the user 102 in response to receiving the interaction request message 172 from the virtual environment device 140.

The entity device 180 comprises a processor 182 operably coupled with a Network interface 184 and a memory 186. Processor 182 comprises one or more processors operably coupled to the memory 186. The processor 182 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 182 may be a programmable logic device, a microcontroller, a microprocessor, or any suitable number and combination of the preceding. The one or more processors are configured to process data and may be implemented in hardware or software. For example, the processor 182 may be 8-bit, 16-bit, 32-bit, 64-bit, or of any other suitable architecture. The processor 182 may include an ALU for performing arithmetic and logic operations. The processor 182 may register the supply operands to the ALU and stores the results of ALU operations. The processor 182 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 188) to perform the operations of the entity device 180 described herein. In this way, processor 182 may be a special-purpose computer designed to implement the functions disclosed herein. In an embodiment, the processor 182 is implemented using logic units, FPGAs, ASICs, DSPs, or any other suitable hardware. The processor 182 is configured to operate as described in FIGS. 1-4. For example, the processor 182 may be configured to perform one or more operations of the operational flow 300 described in FIG. 3 and one or more operations of the method 400 as described in FIG. 4.

Network interface 184 is configured to enable wired and/or wireless communications. The Network interface 184 may be configured to communicate data between the entity device 180 and other devices, systems, or domains of the system 100. For example, the Network interface 184 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 182 may be configured to send and receive data using the Network interface 184. The Network interface 184 may be configured to use any suitable type of communication protocol.

The memory 186 may be volatile or non-volatile and may comprise ROM, RAM, TCAM, DRAM, and SRAM. The memory 186 may include one or more of a local database, cloud database, NAS, etc. The memory 186 comprises one or more disks, tape drives, or solid-state drives, and may be used as an over-flow data storage device, to store programs when such programs are selected for execution, and to store instructions and data that are read during program execution. The memory 186 may store any of the information described in FIGS. 1-4 along with any other data, instructions, logic, rules, or code operable to implement the function(s) described herein when executed by processor 182. For example, the memory 186 may store software instructions 188, resources 158, interaction request message 172, biometric feature extraction machine learning module 330, and/or any other data or instructions. The software instructions 188 may comprise any suitable set of instructions, logic, rules, or code operable to execute the processor 182 and perform the functions described herein, such as some or all of those described in FIGS. 1-4.

Blockchain Network

Blockchain network 190 is a peer-to-peer network of network nodes, and is generally configured to distribute virtual interaction session data 170 (and any other data/information) among the network nodes 192a-n. In certain embodiments, the blockchain network 190 is a distributed database in a network of network nodes 192a-n. In certain embodiments, blockchain network 190 may be a public blockchain network. In certain embodiments, blockchain network 190 may be a private blockchain network. For example, membership in blockchain network 190 may be limited to nodes registered as belonging to and/or affiliated with the organization 108 to which the virtual environment device 140 belongs. In certain embodiments, the virtual environment device 140 may be a member of blockchain network 190 (e.g., as nodes among nodes 192a-n in blockchain network 190).

The blockchain network 190 may comprise any number of network nodes 192a-n to form a distributed network that maintains a blockchain 196. Each network node 192 may comprise a computing device, a virtual machine, a server, a work station, and/or the like. Each network node 192a through 192n of blockchain network 190 stores a blockchain database 194 that is configured to store a copy of a blockchain 196. Each network node 192a through 192n may be an instance of a network node 192. The network node 192 may include a hardware processor, memory, and/or circuitry (not explicitly shown) configured to perform any of the functions or actions of the network node 192 described herein. For example, a software application designed using software code may be stored in the memory and executed by the processor to perform the functions of the network node 192. The network node 192 is configured to communicate with other devices and components of the system 100 via the network 110.

In certain embodiments, the virtual environment device 140 may access the blockchain network 190 via the network 110 to distribute information in the blockchain network 190, including the interaction session data 170. The blockchain network 190 may be configured to distribute interaction session data 170 associated with the avatar 104 and the user 102. The virtual environment device 140 may use a background application programming interface (API) service 174 via the network 110 to access the blockchain network 190.

The blockchain network 190 is configured to establish consensus among the network nodes 192*a-n* about the present state of the blockchain database 194. For example, each network node 192*a-n* comprises a processor in signal communication with a memory storing software instructions that when executed by the processor, cause the network nodes 192*a-n* to implement a consensus protocol procedure through which all the network nodes 192*a-n* of the blockchain network 190 reach a common agreement about the present state of the blockchain database 194. In this way, each network node 192*a-n* achieves reliability in the blockchain network 190 and establishes trust between the network nodes 192*a-n* in a distributed computing environment. Essentially, the consensus protocol makes sure that every new block that is added to the blockchain 196 is the one and only version of the truth that is agreed upon by all the block in the blockchain 196. Blockchain 196 links together blocks of data, which store identifiable units called blockchain data entries. The blockchain data entry may be interchangeably referred to herein as a blockchain data entry. The blockchain data entries stored in the blockchain 196, may include information, files, and/or any other suitable type of data. For example, blockchain data entries may include virtual interaction session data 170 received from the virtual environment device 140. Each virtual interaction session data 170 may be associated with a different virtual interaction session. The virtual interaction session data 170 may include information about a sending entity (e.g., avatar 104, user input 106, user 102), information about a receiving entity (e.g., entity 134), authentication token 176, data transferred (e.g., interaction request message 172, interaction initiate message 150), a timestamp of each data transfer, and/or any other information, for example. With every new data transfer (e.g., every new virtual interaction session 170), a new block of data may be generated and added to the blockchain 196.

Figure 3:
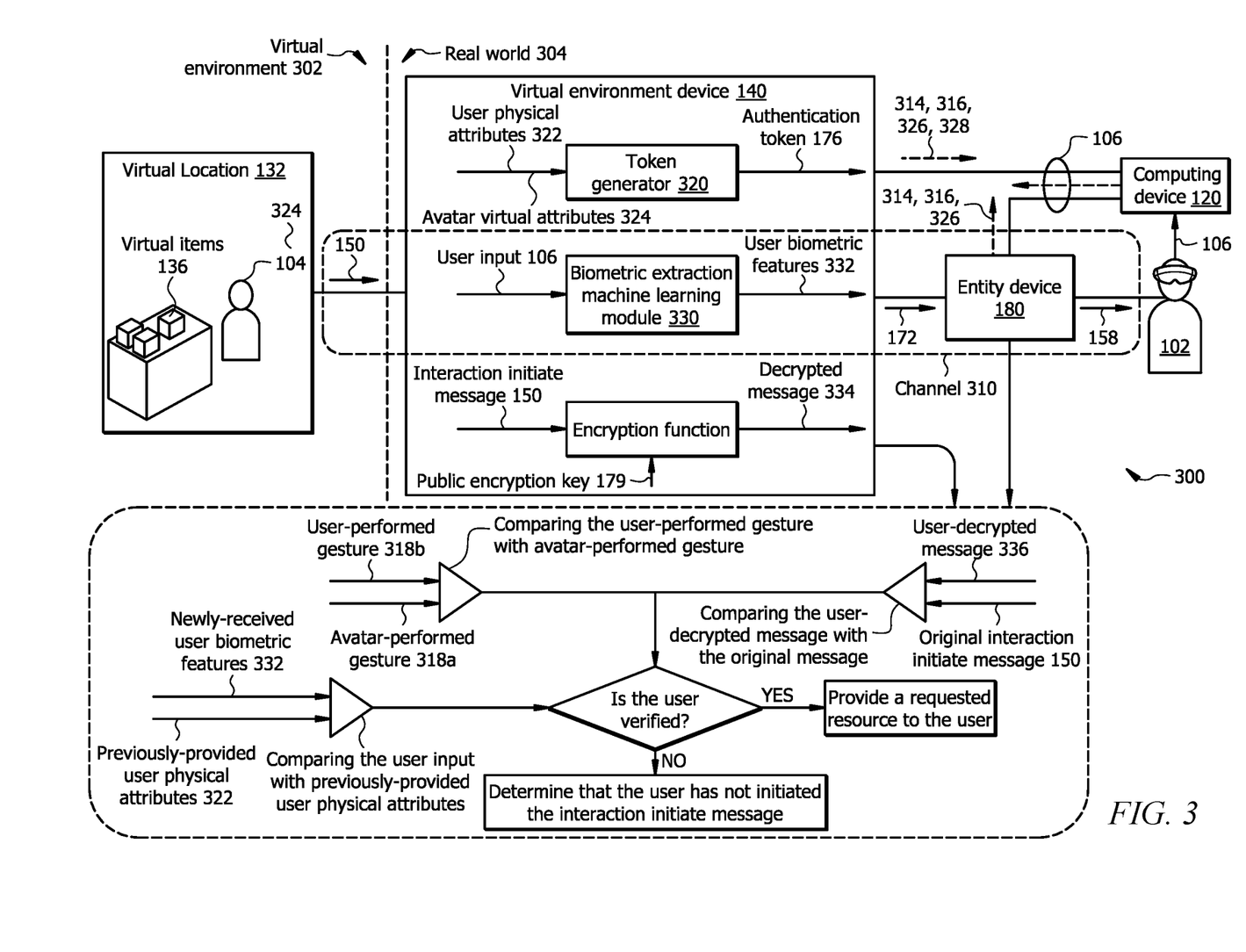
FIG. 3 illustrates an example operational flow of the system of FIG. 1 to establish a secured communication channel that bridges a virtual environment to the real world.

Operational Flow for Establishing a Secured Channel Between the Virtual Environment and the Real World FIG. 3 illustrates an example operational flow 300 of the system 100 of FIG. 1 for establishing a secured channel 310 between the virtual environment 302 and the real world 304. The virtual environment 302 may correspond to the virtual environment 130 described in FIG. 1. The operational flow 300 may begin when the user 102 operates the avatar 104 to initiate a request at a virtual location 132 to receive a particular resource 158 in the real world. In this process, the user 102 can operate the avatar 104 to access and observe the services and/or products (i.e., resources 158) that the entity 134 provides by visiting the virtual location 132. The avatar 104 can interact with virtual items 136 at the virtual location 132 (e.g., pickup, examine, put down, etc.). If the user 102 wants to receive a particular resource 158 (e.g., a physical counterpart of the virtual item 136), the user 102 may operate the avatar 104 to initiate an interaction with the entity 134 and to request to receive the particular resource 158 in the real world. Upon selecting the particular resource 158, the avatar 104 may initiate the request to receive the particular resource 158 by communicating the interaction initiate message 150 to the virtual environment device 140.

The virtual environment device 140 may receive the interaction initiate message 150. The interaction initiate message 150 may include the request 152 to receive the selected resource 158 from the entity 134 in the real world. The interaction initiate message 150 may further include identity tokens 154 and interaction tokens 156. The virtual environment device 140 may determine the identity of the entity 134 and the identity of the user 102 based on the identity tokens 154. The identity tokens 154 may include the identity of the user 102 and the identity of the entity 134. For example, the identity of the user 102 may include and/or based on the name of the user, an identification number associated with the user 102, and/or other information associated with the user 102, such as the user information 168. The identity token 154 indicating the identity of the user 102 may be unique to the user 102. In another example, the identity of the entity 134 may include and/or based on the name of the entity, an identification number associated with the entity 134, and/or other information associated with the entity 134. The identity token 154 indicating the identity of the entity 134 may be unique to the entity 134. The interaction token 156 may include information about providing the particular resource 158 to the user 102, for example, shipping information, user-preferred time of delivery of the physical item, etc.

Generating the Authentication Token

The virtual environment device 140 may generate an authentication token 176 based on one or more physical attributes 322 of the user 102 and one or more virtual attributes 324 of the avatar 104. The virtual environment device 140 may search among the user profiles 162 to find a user profile 162 associated with the user 102 based on the provided identity of the user 102. In response to finding the user profile 162 of the user 102, the virtual environment device 140 may fetch the physical attributes 322 of the user 102 from the user profile 162.

In certain embodiments, when the avatar 104 initiates the request 152, the avatar 104 may also perform a particular gesture 318*a* as operated by the user 102 as an additional security metric for identification and authorization of the user 102. The particular gesture 318*a* may be captured by the virtual environment device 140 and stored in the virtual attributes 324 of the avatar 104. The virtual environment device 140 may also capture the current location of the avatar 104 and store it in the virtual attributes 324 of the avatar 104. The virtual attributes 324 of the avatar 104 may be used in conjunction with the physical attributes 322 of the user 102 to implement a multi-factor authentication that uses both physical attributes 322 of the user 102 and virtual attributes 324 of the avatar 104 to increase the security of the network communication channel 310 between the virtual environment 302 and the real world 304. In this manner, both the user information and the avatar information (in addition to the computing device 120 and the virtual environment device 140) will have to be spoofed by a bad actor in order to gain unauthorized access to the user and/or avatar information or physical/virtual resources-which increases the spoofing complexity. Therefore, the network security of communication channel 310 is increased as well as the security of the user information 165, user profile 162, and avatar information (e.g., the virtual attributes 324), among other information associated with the user.

In certain embodiments, the authentication token 176 may be generated by the token generator 320, similar to that described in FIG. 1. For example, the virtual environment device 140 may feed one or more physical attributes 322 of the user 102 and one or more virtual attributes 324 of the avatar 104 to the token generator 320. The token generator 320 may output the authentication token 176. The authentication token 176 may be a combination of the one or more physical attributes 322 of the user 102 and one or more virtual attributes 324, a piece of code, a vector comprising numerical values, or an alphanumeric value that is unique to the user 102.

Verifying Whether the User Initiated the Request from within the Virtual Environment In certain embodiments, the virtual environment device 140 may generate the interaction request message 172 that includes at least a portion of the interaction initiate message 150 and the authentication token 176. For example, the interaction request message 172 may include one or more of the request 152, the identity tokens 154, the interaction tokens 156, and the authentication token 176. The virtual environment device 140 may communicate the interaction request message 172 to the entity device 180.

The entity device 180 may receive the interaction request message 172 and determine the identity of the user 102 based on the identity token 154 included in the interaction request message 172. In certain embodiments, the entity device 180 may verify whether the user 102 initiated the interaction initiate message 150 by operating the avatar 104 from within the virtual environment 302.

Verifying the User Based on a Biometric Feature of the User

In certain embodiments, verifying whether the user 102 initiated the interaction initiate message 150 may include or in response to verifying whether the authentication token 176 is valid. For example, in case where the authentication token 176 includes biometric features of the user 102, the biometric features of the user may be used to verify the user 102. Thus, in certain embodiments, the entity device 180 and/or the virtual environment device 140 may determine whether the authentication token 176 is valid based on validating biometric features of the user 102. In this process, for example, the entity device 180 and/or the virtual environment device 140 may communicate a message 314 to the computing device 120, where the message 314 may request to provide the identity of the user 102. The user 102 may view the message 314 on the display screen of the computing device 120. The message 314 may indicate what sort of identification is needed. For example, the message 314 may indicate to provide an image showing the user, a fingerprint, and/or an image showing the user performing a gesture, among others. In response, the user 102 may provide user input 106 to the computing device 120, where the user input 106 may be or include an image showing the user, a fingerprint, and/or an image with a gesture, among others.

The computing device 120 may communicate the user input 106 to the entity device 180 and/or the virtual environment device 140. The entity device 180 and/or the virtual environment device 140 may extract the biometric feature 332 of the user 102 from the user input 106. For example, the biometric feature 332 of the user 102 may include facial features, fingerprint patterns and features, retinal features, pose estimation, and voice features, among others. In certain embodiments, the entity device 180 and/or the virtual environment device 140 may implement the biometric extraction machine learning module 330, similar to that described in FIG. 1. For example, in the case that the user input 106 includes an image of the user 102, the entity device 180 and/or the virtual environment device 140 may implement an image processing algorithm included in the biometric extraction machine learning modules 330. In this example, the facial features of the user 102 may be extracted from the image of the user 102. In another example, in the case that the user input 106 includes a fingerprint of the user 102, the entity device 180 and/or the virtual environment device 140 may implement a fingerprint processing algorithm included in the biometric extraction machine learning modules 330. In this example, a biometric feature of the user 102 may be extracted from the fingerprint scan of the user 102. For example, the biometric feature of the user 102 may include fingerprint patterns and features, among others. In other examples, similar operations may be performed for other user inputs, such as a retinal feature sample, a voice feature sample, etc.

The entity device 180 and/or the virtual environment device 140 may compare the extracted biometric feature 332 of the user 102 from the user input 106 with the previously-stored user physical feature extracted from user physical attributes 322 associated with the user 102. In this process, the entity device 180 and/or the virtual environment device 140 may compare a first feature vector that represents the extracted biometric feature 332 from the user input 106 with a second feature vector that represents the previously-stored user physical feature associated with user physical attributes 322. The entity device 180 and/or the virtual environment device 140 may determine a Euclidian distance between the first feature vector and the second feature vector. If it is determined that the Euclidian distance between the first feature vector and the second feature vector is less than a threshold value (e.g., less than 0.1, 0.01, etc.), it may be determined that the newly-provided biometric feature 332 (from the user input 106) corresponds to the previously-stored biometric features extracted from the user physical attributes 322. In response, it may be determined that the user 102 initiated the interaction initiate message 150 from within the virtual environment 302.

In this manner, the system of FIG. 1 provides the practical application of improving the user verification and authentication by implementing an unconventional authentication technique based on a biometric feature of the user 102.

Verifying the User Based on a Gesture Performed by the User and Avatar

In certain embodiments, the entity device 180 and/or the virtual environment device 140 may verify whether the user 102 initiated with interaction initiate message 150 based on a particular gesture 138*a,b* performed by the avatar 104 and the user 102, respectively. In other words, in certain embodiments, the entity device 180 and/or the virtual environment device 140 may determine whether the authentication token 176 is valid based on validating gestures 138*a,b*. To this end, the entity device 180 and/or the virtual environment device 140 may communicate the message 316 to the computing device 120, where the message 316 may indicate to perform a counterpart gesture 318*b* that is a counterpart to the gesture 318*a* that the avatar 104 performed (e.g., in conjunction with or during initiating the interaction initiate message 150). The user 102 may view the message 316 on the display screen of the computing device 120 and provide the user input 106 to the computing device 120, where the user input 106, in certain embodiments, may include an image of the user 102 performing the counterpart gesture 318*b*. For example, the gesture 318*a* and its counterpart gesture 318*b* may be waving a right hand, waving a left hand, holding the index finger in right hand up, jumping, or crunching down, among other gestures.

The entity device 180 and/or the virtual environment device 140 may extract features from the user input 106 by feeding the user input 106 to an image processing machine learning algorithm that comprises a neural network. The extracted features may indicate the gesture performed by the user 102 as shown in the image. The extracted features may be represented by a first feature vector comprising numerical values. The entity device 180 and/or the virtual environment device 140 may compare the first feature vector that represents the counterpart gesture 318b performed by the user 102 with a second feature vector that represents the gesture 318a performed by the avatar 104. The entity device 180 and/or the virtual environment device 140 may determine a Euclidian distance between the first feature vector and the second feature vector. If it is determined that the Euclidian distance between the first feature vector and the second feature vector is less than a threshold value (e.g., less than 0.1, 0.01, etc.), it may be determined that the gesture 318a performed by the avatar 104 corresponds to the gesture 318b performed by the user 102. In response, it may be determined that the user 102 initiated the interaction initiate message 150 from within the virtual environment 302.

In certain embodiments, the message 316 may request to indicate what gesture 318a the avatar 104 performed in conjunction with or during initiating the interaction initiate message 150—without actually having the user 102 to perform the counterpart gesture 318b. Thus, in certain embodiments, the entity device 180 and/or the virtual environment device 140 may determine that the user 102 initiated the interaction initiate message 150 from within the virtual environment 302 if the user input 106 indicates the correct gesture 318a that avatar 104 has performed.

In this manner, the system of FIG. 1 provides the practical application of improving the user verification and authentication by implementing an unconventional authentication technique based on a gesture performed by the user 102 and avatar 104.

Verifying the User Based on User Input on Avatar Attributes

In certain embodiments, the entity device 180 and/or the virtual environment device 140 may verify whether the user 102 initiated with interaction initiate message 150 based on a user input 106 on avatar attributes, including a location of the avatar 104, among others. In other words, in certain embodiments, the entity device 180 and/or the virtual environment device 140 may determine whether the authentication token 176 is valid based on a user input 106 on avatar attributes, including a location of the avatar 104, among others. For example, the entity device 180 and/or the virtual environment device 140 may communicate a message 326 to the computing device 120, where the message 326 indicates to provide information about the virtual location of the avatar 104 in the virtual environment 302. The user 102 may view the message 326 and provide the user input 106 that indicates the counterpart virtual location of the avatar 104 to the computing device 120. The computing device 120 may communicate the user input 106 to the entity device 180 and/or the virtual environment device 140.

The entity device 180 and/or the virtual environment device 140 may compare the actual virtual location of the avatar 104 (e.g., latitude and longitude values, GPS location coordinate) with the counterpart virtual location of the avatar 104 provided in the user input 106. If it is determined that the actual virtual location of the avatar 104 corresponds with the counterpart virtual location of the avatar 104, it may be determined that the user 102 initiated with interaction initiate message 150. In the same or other examples, other avatar attributes (e.g., visual attributes of the avatar 104 may be asked from the user 102 and used in verifying the user 102.

In this manner, the system of FIG. 1 provides the practical application of improving the user verification and authentication by implementing an unconventional authentication technique based on a user input 106 on avatar attributes.

Verifying the User Based on a Decrypted Message Provided by the User

In certain embodiments, the entity device 180 and/or the virtual environment device 140 may verify whether the user 102 initiated with interaction initiate message 150 based on a decrypted message 336 provided by the user 102. For example, the virtual environment device 140 may encrypt at least a portion of the interaction initiate message 150 before including any of its portions in the interaction request message 172. The virtual environment device 140 may encrypt at least a portion of the interaction initiate message 150 by feeding at least the portion of the interaction initiate message 150 to the encryption algorithm 177, similar to that described in FIG. 1. The virtual environment device 140 may use the public encryption key 179 to encrypt the at least portion of the interaction initiate message 150 to produce the decrypted message 334. For example, the virtual environment device 140 may encrypt the interaction token 156. Thus, in this example, the virtual environment device 140 may include the encrypted interaction token 156 in the interaction request message 172. In this or other examples, other portion(s) of the interaction initiate message 150 may be encrypted. Therefore, in certain embodiments, verifying that the user 102 initiated the interaction initiate message 150 may be based on requesting the user 102 to decrypt portion(s) of the encrypted interaction initiate message 150 and determining whether the user 102 provides the expected and decrypted portion(s) interaction initiate message 150. In this process, the virtual environment device 140 may communicate a message 328 to the computing device 120, where the message 328 may include the encrypted portion(s) of the interaction initiate message 150 and indicates to decrypt the encrypted portion(s) of the interaction initiate message 150. The user 102 may be previously provided with a particular private encryption key 178 that is configured to decrypt the encrypted portion(s) of the interaction initiate message 150. The user 102 may decrypt the encrypted portion(s) of the interaction initiate message 150 using the private encryption key 178. The user 102 may provide a user input 106 that includes the decrypted portion(s) of the interaction initiate message 150 (i.e., the user-decrypted message 336) to the computing device 120. The computing device 120 may communicate the user input 106 to the virtual environment device 140.

The virtual environment device 140 may determine whether the user-provided decrypted portion(s) of the interaction initiate message 150 corresponds to the counterpart original portion(s) of the interaction initiate message 150 before the encryption process. If it is determined that the user-provided decrypted portion(s) of the interaction initiate message 150 corresponds to the counterpart original portion(s) of the interaction initiate message 150, the virtual environment device 140 may determine that the user 102 is an authorized user and initiated the interaction initiate message 150. In response, the virtual environment device 140 may inform the entity device 180 that the user 102 is an authorized user and initiated the interaction initiate message 150.

In this manner, the system of FIG. 1 provides the practical application of improving the user verification and authentication by implementing an unconventional authentication technique based on a decrypted message provided by the user 102.

In certain embodiments, the virtual environment device 140 and/or the entity device 180 may implement any number and any combination of the user multi-factor authentication methods described herein. In response to verifying that the user 102 has initiated the interaction initiate message 150, the entity device 180 may provide the requested resource 158 to the user 102 in the real world. For example, if the requested resource 158 is a physical item, the entity device 180 may send the physical item to the address of the user 102. In another example, if the requested resource 158 is a server, the entity device 180 may facilitate its personnel to provide the service to the user 102. The data associated with the interaction between the avatar 104, the user 102, the virtual environment device 140, and the entity device 180 may be saved in the interaction session data 170 and stored in a data block in the blockchain network (190 in FIG. 1). This information may be tracked to determine the pattern of fraudulent activities for different users, avatars, and entities and perform countermeasure actions 338 to address the fraudulent activities.

In an example use case, assume that the user 102 wants to receive a physical item by requesting a counterpart virtual item 136 at the virtual store 132. The user 102 may operate the avatar 104 to perform the virtual interaction at the virtual store 132. The avatar 104 may provide information for conducting the transaction of the counterpart physical item to the virtual environment device 140. For example, the avatar 104 may provide identity of the user 102, cost of the physical item, shipping information, etc. The virtual environment device 140 and/or the entity device 180 may determine whether the user 102 is a legitimate user who initiated the interaction initiate message 150 by implementing the multi-factor authentication methods described herein. In response to determining that the user 102 initiated the interaction initiate message 150, the entity device 180 may conclude the transaction of the physical item by using the provided method information. In response, the entity device 180 may facilitate providing the physical item to the user 102, e.g., by communicating a shipping request for the physical item to personnel who manage the list or items and shipping.

Figure 4:
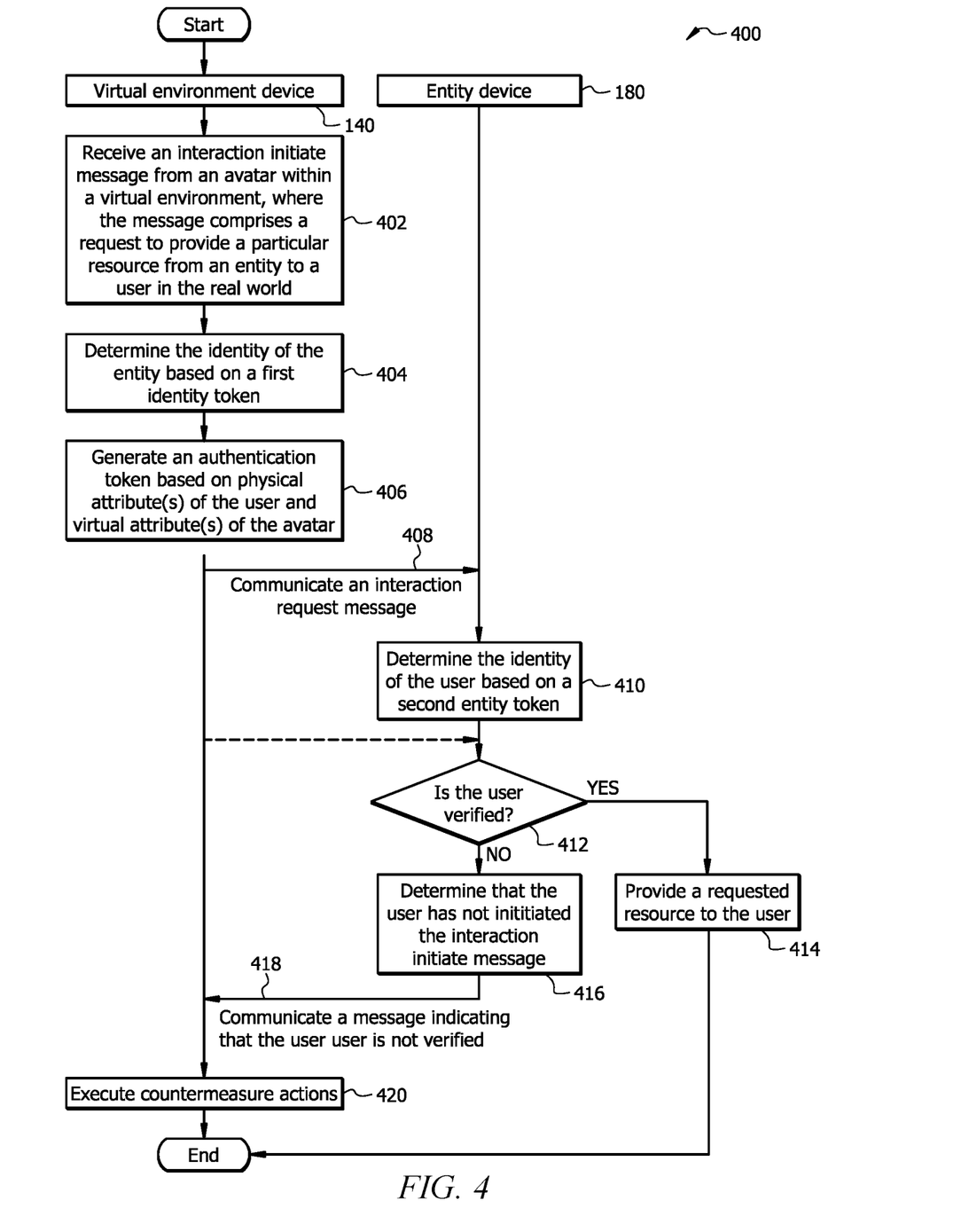
FIG. 4 illustrates an example flowchart of a method to establish a secured communication channel that bridges a virtual environment to the real world.

Example Method Establishing a Secured Channel Between the Virtual Environment and the Real World FIG. 4 illustrates an example flowchart of a method 400 for establishing a secured channel between the virtual environment and the real world. Modifications, additions, or omissions may be made to method 400. Method 400 may include more, fewer, or other operations. For example, operations may be performed in parallel or in any suitable order. While at times discussed as the system 100, virtual environment device 140, entity device 180, computing device 120, or components of any of thereof performing operations, any suitable system or components of the system may perform one or more operations of the method 400. For example, one or more operations of method 400 may be implemented, at least in part, in the form of software instructions 148, 188 of FIG. 1, stored on non-transitory, tangible, machine-readable media (e.g., memory 146, 186 of FIG. 1) that when run by one or more processors (e.g., processor 142, 182 of FIG. 1) may cause the one or more processors to perform operations 402-420.

At operation 402, the virtual environment device 140 receives an interaction initiate message 150 from an avatar 104 within the virtual environment 130, where the message 150 comprises a request 152 to provide a particular resource 158 from an entity 134 to the user 102 in the real world. For example, the virtual environment device 140 may receive the interaction initiate message 150 when the user 102 operates the avatar 104 at the virtual location 132, similar to that described in FIGS. 1 and 3.

At operation 404, the virtual environment device 140 determines the identity of the user 102 based on a first identity token 154 that is included in the interaction initiate message 150. For example, the virtual environment device 140 may parse the interaction initiate message 150 to determine the request 152, identity tokens 154, and interaction token 156.

At operation 406, the virtual environment device 140 generates an authentication token 176 based on physical attribute(s) 322 of the user 102 and virtual attribute(s) of the avatar 104. In this process, the virtual environment device 140 may feed the physical attribute(s) 322 of the user 102 and virtual attribute(s) 324 of the avatar 104 to the token generator 320 to generate the authentication token 176, similar to that described in FIGS. 1 and 3. The virtual environment device 140 may generate the interaction request message 172 and include at least a portion of the interaction initiate message 150 and the authentication token 176 in the message 172.

At operation 408, the virtual environment device 140 communicates the interaction request message 172 to the entity device 180. At operation 410, the entity device 180 determines the identity of the user 102 based on a second identity token 154. For example, the entity device 180 may parse the interaction request message 172 and determine that it include the identity tokens 154.

At operation 412, it is determined whether the user 102 is verified. Although, the illustrated example of the method 400 shows that the entity device 180 performs the operation 412, other embodiments are contemplated by the present disclosure. In certain embodiments, the virtual environment device 140 may perform the operation 412 and provide the results to the entity device 180. In certain embodiments, one or both of the entity device 180 and the virtual environment device 140 may perform the operation 412. The entity device 180 and/or the virtual environment device 140 may determine whether the user 102 is a valid user who initiated the interaction initiate message 150 via the avatar 104 by implementing multi-factor authentication techniques, similar to that described in FIG. 3. If it is determined that the user 102 is verified, method 400 may proceed to operation 414. Otherwise, method 400 may proceed to operation 416.

At operation 414, the entity device 180 provides the requested resource 158 to the user 102, similar to that described in FIG. 3. At operation 416, the entity device 180 may determine that the user 102 has not associated with the interaction initiate message 150.

At operation 418, the entity device 180 communicates a message that indicates the user 102 is not verified to the virtual environment device 140. In certain embodiments where the virtual environment device 140 performs the operation 412, operation 418 may not be needed. In certain embodiments, operations 416 may be performed by the virtual environment device 140.

At operation 420, the virtual environment device 140 may execute countermeasure actions 338 to secure the user profile 162 and user information 165, 168 associated with the user 102. For example, the countermeasure actions 338 may include communicating an alert message that indicates the profile of the user 102 and/or the avatar 104 is accessed by a bad actor to the computing device 120 and/or another device associated with the user 102, close/suspend the profile of the user 102 for accessing the virtual environment 130 to be verified by the user 102, and the like. In certain embodiments, the entity device 180 may perform countermeasure actions 338, such as suspending the profile of the user at the entity 134 until it is verified by the user 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for concluding a request in a real world based on an initiation from a virtual environment, comprising:
   a virtual environment device comprising:
      a first memory configured to store avatar information that indicates attributes of an avatar within a virtual environment, wherein the avatar is associated with a user; and
      a first processor operably coupled with the first memory, and configured to:
         receive an interaction initiate message from the avatar, wherein:
            the interaction initiate message comprises a request to receive a particular resource from an entity in the real world;
            the interaction initiate message further comprises an identity token and an interaction token;
            the identity token indicates a first identity of the user and a second identity of the entity;
            the interaction token comprises information about providing the particular resource to the user; and
         determine the second identity of the entity based at least in part upon the identity token; and
         in response to determining the second identity of the entity, communicate an interaction request message to an entity device associated with the entity, wherein the entity devices resides in the real world and the interaction request message comprises at least a portion of the interaction initiate message and an authentication token that is used to verify the user, wherein the authentication token is based at least in part upon one or more physical attributes of the user and a gesture performed by the avatar;
   the entity device in the real world communicatively coupled with the virtual environment device, and comprising:
      a second memory configured to store information about resources that the entity provides to users; and
      a second processor operably coupled with the second memory, and configured to:
         receive the interaction request message;
         determine the first identity of the user based at least in part upon the identity token;
         verify that the user initiated the interaction initiate message from within the virtual environment via the avatar based at least in part upon determining that the authentication token is valid, wherein determining that the authentication token is valid comprises validating that the gesture performed by the avatar in the virtual world corresponds with a counterpart gesture received from the user in the real world; and
         in response to verifying that the user initiated the interaction initiate message from within the virtual environment via the avatar, provide the particular resource to the user in the real world.

2. The system of claim 1, wherein receiving the interaction initiate message is in response to the avatar interacting with a virtual item at a virtual location associated with the entity within the virtual environment, wherein the virtual item is a virtual representation of the particular resource.

3. The system of claim 1, wherein:
   the first processor is further configured to encrypt at least a portion of the interaction initiate message by a public encryption key;
   the encrypted portion of the interaction initiate message comprises the interaction token;
   verifying that the user initiated the interaction initiate message from within the virtual environment via the avatar is in response to:
      communicating a first message indicating to decrypt the encrypted interaction initiate message to a user device associated with the user; and
      receiving a decrypted interaction initiate message from the user device, in response to the user decrypting the encrypted interaction initiate message using a private encryption key, wherein the private encryption key is configured to decrypt the encrypted interaction initiate message.

4. The system of claim 1, wherein:
   the first processor is further configured to generate the authentication token based at least in part upon one or more physical attributes of the user and one or more virtual attributes of the avatar;
   the authentication token is an alphanumeric value that is unique to the user;
   the interaction request message further comprises the authentication token; and
   verifying that the user initiated the interaction initiate message from within the virtual environment via the avatar is in response to determining that the authentication token is valid.

5. The system of claim 4, wherein determining that the authentication token is valid is in response to:
   communicating a second message indicating to provide user data that indicates the first identity of the user to a user device associated with the user;
   receiving the user data from the user device, wherein the user data comprises an image or a fingerprint of the user;

determining a second biometric feature from the received user data;

comparing the first biometric feature with the second biometric feature; and determining that the first biometric feature corresponds to the second biometric feature.

6. The system of claim 4, wherein determining that the authentication token is valid is in response to:

communicating a third message indicating to perform the counterpart gesture to the gesture performed by the avatar as indicated in the authentication token; and receiving a user input indicating the counterpart gesture performed by the user, wherein the user input comprises an image of the user performing the counterpart gesture.

7. The system of claim 4, wherein determining that the authentication token is valid is in response to:

communicating a fourth message indicating to provide information about a virtual location of the avatar;

receiving a user input comprising a counterpart virtual location from a user device associated with the user;

comparing the actual virtual location of the avatar with the counterpart virtual location; and determining that the counterpart virtual location of the avatar corresponds to the actual virtual location of the avatar.

8. A method for concluding a request in a real world based on an initiation from a virtual environment, comprising:

storing, in a first memory, avatar information that indicates attributes of an avatar within a virtual environment, wherein the avatar is associated with a user; and receiving, by a virtual environment device, an interaction initiate message from the avatar, wherein:

the interaction initiate message comprises a request to receive a particular resource from an entity in the real world;

the interaction initiate message further comprises an identity token and an interaction token;

the identity token indicates a first identity of the user and a second identity of the entity;

the interaction token comprises information about providing the particular resource to the user; and determining, by the virtual environment device, the second identity of the entity based at least in part upon the identity token; and in response to determining the second identity of the entity, communicating, by the virtual environment device, an interaction request message to an entity device associated with the entity, wherein the entity devices resides in the real world and the interaction request message comprises at least a portion of the interaction initiate message and an authentication token that is used to verify the user, wherein the authentication token is based at least in part upon one or more physical attributes of the user and a gesture performed by the avatar;

storing, in a second memory, information about resources that the entity provides to users; and receiving, by the entity device, the interaction request message;

determining, by the entity device, the first identity of the user based at least in part upon the identity token;

verifying, by the entity device, that the user initiated the interaction initiate message from within the virtual environment via the avatar based at least in part upon determining that the authentication token is valid, wherein determining that the authentication token is valid comprises validating that the gesture performed by the avatar in the virtual world corresponds with a counterpart gesture received from the user in the real world; and in response to verifying that the user initiated the interaction initiate message from within the virtual environment via the avatar, providing, by the entity device, the particular resource to the user in the real world.

9. The method of claim 8, wherein receiving the interaction initiate message is in response to the avatar interacting with a virtual item at a virtual location associated with the entity within the virtual environment, wherein the virtual item is a virtual representation of the particular resource.

10. The method of claim 8, wherein:

the method further comprises encrypting, by the virtual environment device, at least a portion of the interaction initiate message by a public encryption key;

the encrypted portion of the interaction initiate message comprises the interaction token;

verifying that the user initiated the interaction initiate message from within the virtual environment via the avatar is in response to:

communicating a first message indicating to decrypt the encrypted interaction initiate message to a user device associated with the user; and receiving a decrypted interaction initiate message from the user device, in response to the user decrypting the encrypted interaction initiate message using a private encryption key, wherein the private encryption key is configured to decrypt the encrypted interaction initiate message.

11. The method of claim 8, wherein:

the method further comprises generating the authentication token based at least in part upon one or more physical attributes of the user and one or more virtual attributes of the avatar;

the authentication token is an alphanumeric value that is unique to the user;

the interaction request message further comprises the authentication token; and verifying that the user initiated the interaction initiate message from within the virtual environment via the avatar is in response to determining that the authentication token is valid.

12. The method of claim 11, wherein determining that the authentication token is valid is in response to:

communicating a second message indicating to provide user data that indicates the first identity of the user to a user device associated with the user;

receiving the user data from the user device, wherein the user data comprises an image or a fingerprint of the user;

determining a second biometric feature from the received user data;

comparing the first biometric feature with the second biometric feature; and determining that the first biometric feature corresponds to the second biometric feature.

13. The method of claim 11, wherein determining that the authentication token is valid is in response to:

communicating a third message indicating to perform the counterpart gesture to the gesture performed by the avatar as indicated in the authentication token; and receiving a user input indicating the counterpart gesture performed by the user, wherein the user input comprises an image of the user performing the counterpart gesture.

14. The method of claim 11, wherein determining that the authentication token is valid is in response to:
communicating a fourth message indicating to provide information about a virtual location of the avatar;
receiving a user input comprising a counterpart virtual location from a user device associated with the user;
comparing the actual virtual location of the avatar with the counterpart virtual location; and
determining that the counterpart virtual location of the avatar corresponds to the actual virtual location of the avatar.

15. An apparatus, comprising:
a memory configured to store avatar information that indicates attributes of an avatar within a virtual environment, wherein the avatar is associated with a user; and
a processor operably coupled with the memory, and configured to:
receive an interaction initiate message from the avatar, wherein:
the interaction initiate message comprises a request to receive a particular resource from an entity in the real world;
the interaction initiate message further comprises an identity token and an interaction token;
the identity token indicates a first identity of the user and a second identity of the entity;
the interaction token comprises information about providing the particular resource to the user; and
determine the second identity of the entity based at least in part upon the identity token; and
in response to determining the second identity of the entity, communicate an interaction request message to an entity device associated with the entity, wherein the entity devices resides in the real world and the interaction request message comprises at least a portion of the interaction initiate message and an authentication token that is used to verify the user, wherein the authentication token is based at least in part upon one or more physical attributes of the user and a gesture performed by the avatar;
verify that the user initiated the interaction initiate message from within the virtual environment via the avatar based at least in part upon determining that the authentication token is valid, wherein determining that the authentication token is valid comprises validating that the gesture performed by the avatar in the virtual world corresponds with a counterpart gesture received from the user in the real world, wherein in response to verifying that the user initiated the interaction initiate message from within the virtual environment via the avatar, the particular resource is provided to the user in the real world.

16. The apparatus of claim 15, wherein receiving the interaction initiate message is in response to the avatar interacting with a virtual item at a virtual location associated with the entity within the virtual environment, wherein the virtual item is a virtual representation of the particular resource.

17. The apparatus of claim 15, wherein:
the processor is further configured to encrypt at least a portion of the interaction initiate message by a public encryption key;
the encrypted portion of the interaction initiate message comprises the interaction token;
verifying that the user initiated the interaction initiate message from within the virtual environment via the avatar is in response to:
communicating a first message indicating to decrypt the encrypted interaction initiate message to a user device associated with the user; and
receiving a decrypted interaction initiate message from the user device, in response to the user decrypting the encrypted interaction initiate message using a private encryption key, wherein the private encryption key is configured to decrypt the encrypted interaction initiate message.

18. The apparatus of claim 15, wherein:
the processor is further configured to generate the authentication token based at least in part upon one or more physical attributes of the user and one or more virtual attributes of the avatar;
the authentication token is an alphanumeric value that is unique to the user;
the interaction request message further comprises the authentication token; and
verifying that the user initiated the interaction initiate message from within the virtual environment via the avatar is in response to determining that the authentication token is valid.

19. The apparatus of claim 18, wherein determining that the authentication token is valid is in response to:
communicating a second message indicating to provide user data that indicates the first identity of the user to a user device associated with the user;
receiving the user data from the user device, wherein the user data comprises an image or a fingerprint of the user;
determining a second biometric feature from the received user data;
comparing the first biometric feature with the second biometric feature; and
determining that the first biometric feature corresponds to the second biometric feature.

20. The apparatus of claim 15, wherein the particular resource comprises a physical item or a service.

* * * * *